May 30, 1961 R. H. FARQUHAR 2,985,969
MECHANISM FOR SIMULATING THE RELATIVE MOVEMENTS OF THE
EARTH, THE CELESTIAL SPHERE AND AN EARTH SATELLITE
Filed Oct. 5, 1959 2 Sheets-Sheet 2
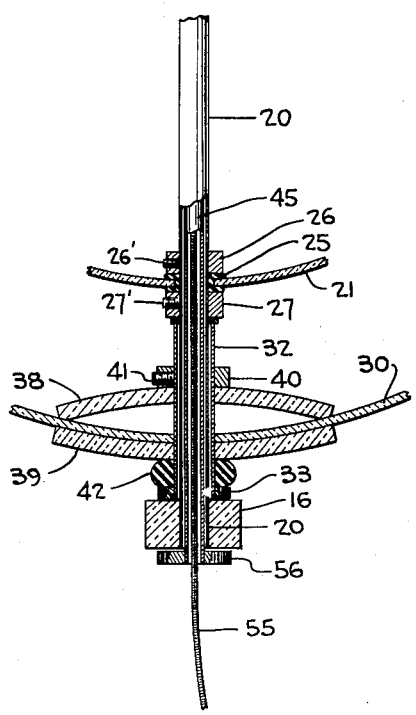
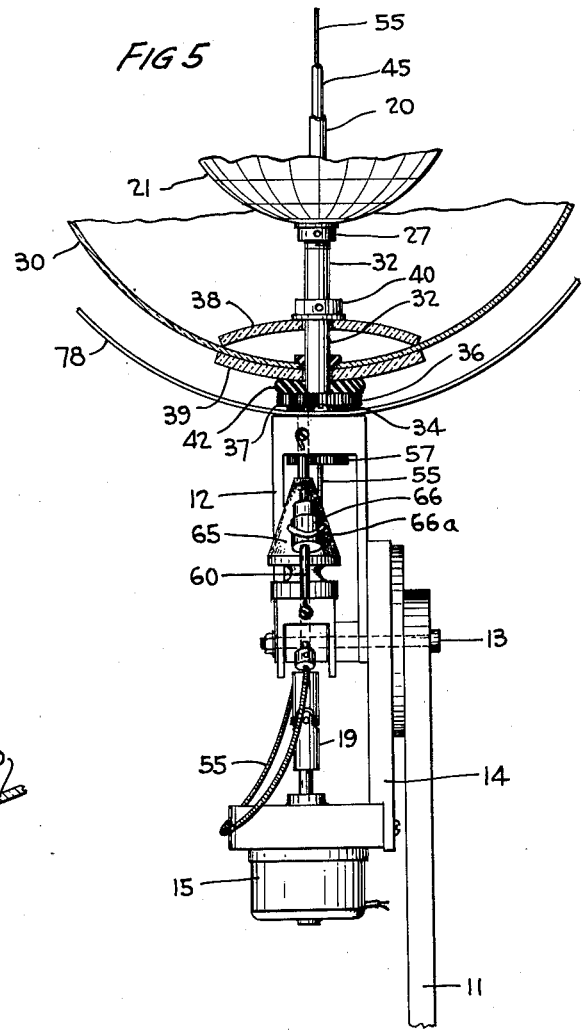
INVENTOR
ROBERT H. FARQUHAR
BY Watson, Cole, Grindle & Watson
ATTORNEY United States Patent Office 2,985,969
Patented May 30, 1961

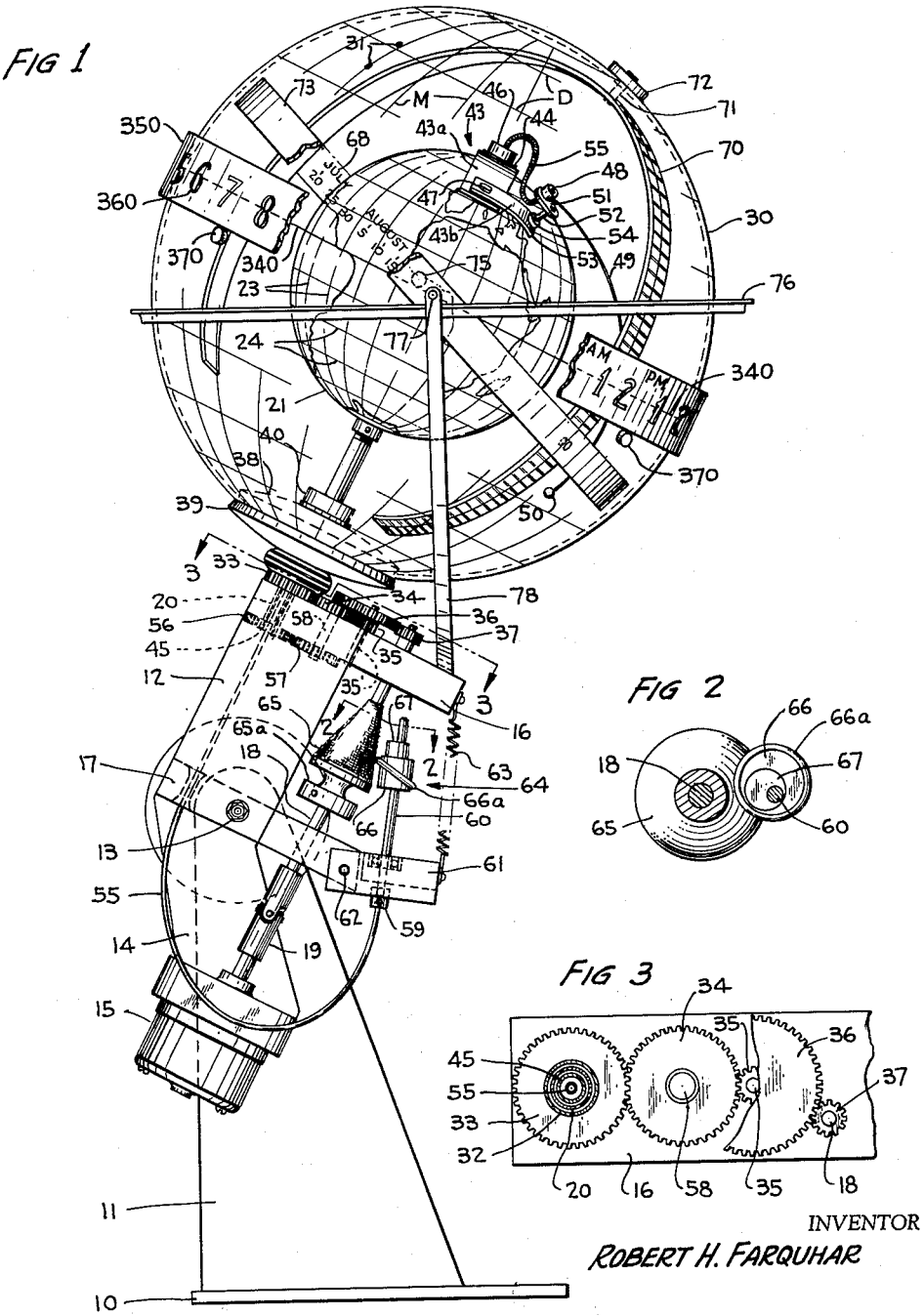

2,985,969
MECHANISM FOR SIMULATING THE RELATIVE MOVEMENTS OF THE EARTH, THE CELESTIAL SPHERE AND AN EARTH SATELLITE

Robert Hamilton Farquhar, St. Davids, Pa.
(3724 Irving St., Philadelphia 4, Pa.)

Filed Oct. 5, 1959, Ser. No. 844,325
14 Claims. (Cl. 35—47)

This invention relates to an apparatus for simulating the relative movements of a simulated earth satellite, the earth and various celestial bodies, which may include the sun, as well as fixed stars.

In accordance with the invention, an earth sphere, having thereon a map of the earth's surface, is maintained stationary, while a transparent celestial sphere and/or a simulated earth satellite are rotated around the earth sphere, with the celestial sphere properly oriented to and revolving around the earth's axis and the simulated satellite pursuing an orbit, which, though fixed with respect to the celestial sphere, is in a constantly changing path with respect to the earth or terrestrial sphere.

It is an important object to provide for independent adjustment of various of the components of the orbit pursued by the simulated satellite, such as the angular relation of its orbital axis to the earth's axis, the diameter of its orbit, eccentricity thereof to the earth's center, number of orbits per unit of time, and variations in speed at different points in each orbit, all to the end that the orbit of the simulated satellite may be coordinated with and made to simulate the actions of an actual artificial earth satellite.

It is a further object to provide a novel driving and mounting means for the simulated satellite and its associated components, which remains fully operative following any of the aforesaid adjustments.

In order to achieve these ends, both the earth sphere and the celestial sphere are mounted for rotation about a common tubular shaft through which the drive means for the simulated satellite extend. The satellite drive includes a further tubular shaft rotatably disposed through the first shaft, and carrying at one end a radial supporting arm, preferably of adjustable length, which is curved about and exteriorly to the earth sphere and which defines at its free end an axis about which the simulated satellite orbits. This arm rotates in a predetermined path about the terrestrial sphere, while the simulated satellite is carried by a sweep arm which rotates about the said axis at its free end. Rotation is imparted to the sweep arm in the preferred embodiment through a flexible shaft extending concentrically through the said tubular drive shafts.

It is a further object to provide yielding interconnections between the simulated satellite, the terrestrial and celestial spheres and their respective drive means, so that these may be manually preset or positioned in properly oriented relation with respect to each other in a manner corresponding to the actual positions at a given time of the earth, the celestial sphere and an actual satellite, whereby their coordinated movements thereafter may indicate the relative positions of the actual satellite, earth and celestial body at any given point in the orbit of the satellite.

A particularly novel feature of the invention resides in the means for mounting and driving the terrestrial and celestial spheres in concentric relation, together with the means for mounting and driving the simulated satellite through an orbit in the space between said spheres, all in a manner whereby the driving mechanism itself interferes to a minimum extent with the visibility of the positions of the respective parts.

A further feature consists in providing for universal adjustment of the aforesaid orbital axis with respect to the earth's axis and/or the rotational axis of the celestial sphere.

A still further feature of the invention consists in its provisions for varying the number of orbits made by the simulated satellite within a given period and also for varying the speed of the simulated satellite at various points throughout its orbit in a manner corresponding with variations in the speed of an actual satellite in which the speed of the satellite is greatest at its perigee, or point of closest approach to the earth, and is at a minimum at its apogee or most remote point of its orbit from the earth.

Further features consist in the provision of a novel means for readily ascertaining the geographical position of the satellite over the earth's surface at any given date and time. In this connection, means also are provided for determining the position of the sun at any given time relative to the earth and the satellite.

A preferred embodiment of apparatus for carrying out the invention and achieving the foregoing features and advantages is illustrated in the accompanying drawings in which:

Figure 1 is a side elevation of an apparatus in accordance with the invention;

Figure 2 is a cross-section on the line 2—2 of Figure 1 illustrating details of the frictional drive mechanism for the simulated satellite;

Figure 3 is a plan section on the line 3—3 of Figure 1;

Figure 4 is a somewhat enlarged fragmentary section taken along the axis of the supporting and drive shafts;

Figure 5 is a more comprehensive view than Figure 4, though taken partly in section along the same plane as Figure 4 and partly in front elevation.

Referring now in detail to the accompanying drawings, a suitable frame for supporting the various component parts of the invention is exemplified by the horizontal base plate 10 from which projects upwardly a rigid supporting standard or lower frame section 11. The frame section 11 is preferably of flat plastic or other suitable material. An upper adjustable frame section 12 is pivotally secured as at 13 by a usual nut and bolt for angular adjustment about the pivot 13, whereby the various components carried by the adjustable upper section 12 may be readily positioned for convenient inspection.

The adjustable upper section 12 preferably also includes a depending lower portion 14 below the pivots 13, on which is fixedly secured a suitable constant speed electric or other motor which exemplifies a driving means for the various movable components hereinafter described.

Also fixedly carried by and included as part of the upper frame section 12 are a pair of relatively spaced parallel shelves or brackets 16 and 17, through which is rotatably journaled a drive shaft 18, which is connected to the output shaft of the motor 15, preferably through a universal joint 19, the latter being for the usual purpose of compensating for slight misalignment as between the shaft 18 and the rotational axis of the motor 15.

Extending through and fixedly secured to the bracket 16 of the frame is the lower end of a hollow tubular shaft 20, on the upwardly projecting free end portion of which is carried an earth globe or terrestrial sphere 21, preferably of hollow, transparent plastic construction and having thereon a map of the earth's surface, together with the major longitudinal meridians 23 and latitudinal indicia 24. The shaft 20 extends completely through the terrestrial sphere 21 from pole to pole and thus has its axis coincident with the rotational axis of the earth. Normally the terrestrial sphere 21 is fixed against rotation about the tubular shaft 20, though it is but frictionally or yieldingly so held, in order that it may be manually rotated about its shaft 20 to properly orient it with certain of the other components, more particularly, the celestial sphere hereinafter described. A suitable slip clutch or frictional retaining arrangement for thus yieldably interconnecting the shaft 20 and sphere 21 against rotary movement is illustrated in Figure 4 of the accompanying drawings, wherein it will be seen that the shaft 20 enters the sphere 21 through an opening formed at its south pole portion. A flanged rubber grommet 25 disposed in the hole around the shaft 20 is somewhat compressed in an axial direction into frictional gripping engagement with the sphere 21, as by means of the metal collars 26 and 27, which are fixedly positioned on the shaft 20 above and below the grommet 25 as by means of the set screws 26' and 27', respectively.

Concentrically enclosing the terrestrial sphere 21 is a celestial sphere 30 of transparent material having various of the major celestial bodies depicted thereon in their proper relative positions as designated by the reference character 31. Only several of these are shown for purposes of illustration in the accompanying drawings, in order to avoid possibility of confusion, though it should be appreciated that, in actual practice, a considerable number of the major celestial bodies may be designated on the celestial sphere 30 in their properly oriented positions. It is also found to facilitate the use of the apparatus if suitable markings are applied to the celestial sphere to indicate the major celestial meridians M and also indications of declination D.

In order to permit ready access to the interior of the celestial sphere for adjustment of the components contained therein, the celestial sphere in the preferred embodiment is formed in two hemispherical halves joined together along the equinoctial plane 340 in edge-to-edge relation and maintained in such relation by means of an encircling, loosely-fitting annular band or ring 350 of transparent material. This band overlies the equinoctial 340 and preferably is provided with markings extending therearound as at 360, indicating each of the twelve a.m. hours of the day and each of the p.m. hours of the day for purposes hereinafter appearing. The time designating ring 350 is supported by means of the radially projecting studs 370 on the lower hemisphere of the celestial sphere 30 for manual adjustment to any desired angular position in the plane of the equinoctial 34.

The present invention proceeds upon the accepted theory that an understanding of the relative motions of the earth and the celestial bodies is facilitated by imagining that the earth itself remains fixed, while the celestial bodies revolve therearound. It is with this in mind that the terrestrial sphere 21 is normally supported in a stationary position. Similarly, the celestial sphere 30 is made to revolve at a constant speed around the earth's axis. To this end and as illustrated in Figures 1, 4 and 5 of the drawings, the celestial sphere 30 is supported at its south pole by means of a tubular shaft 32 rotatably journaled about the fixed shaft 20. At its lower exterior end the shaft 32 has fixed thereon a spur gear 33, located just above the frame bracket 16. A constant speed drive is imparted to this shaft 32 by a chain of reduction gearing 33, 34, 35 and 36, wherein the terminal gear 36 is enmeshed with and driven by a drive pinion 37 fixed on the drive shaft 18. The reduction gearing thus far described is best shown in Figures 1 and 3 considered together, and such gearing is disposed above the supporting frame bracket 16.

In order to facilitate the relative angular positioning of the sphere 30 with respect to the sphere 31 at the inception of their operation, it is desirable that the sphere 30 also be yieldably clutched to its shaft 32. A suitable means for accomplishing this is illustrated in detail in Figure 4, in which a pair of opposed washers 38 and 39, respectively, are disposed on the shaft 32 for engagement with the inner and outer surfaces, respectively, of the sphere 30, and are held under axial compression against these surfaces by a collar 40 axially positioned on the shaft 32 by means of the set screw 41, to thus provide a reinforced support for the sphere 30. The washers 38 and 39 are thus confined between this fixedly positioned collar 40 and a resiliently axially compressible annular member 42 of rubber or other suitable material, the lower face of which abuts axially against the gear 33 on shaft 32. Thus the upper face of the annular cushion or spring 32 will tend at all times to maintain a resilient frictional engagement with the washers 38, but will yield against the application of a manual force imposed on the sphere 30 to adjustably position it in any desired angular position about its shaft 32.

It will thus be apparent from the foregoing that, after the two spheres 21 and 30 are manually angularly positioned in the proper relationships for a given date, as determined by reference to a nautical almanac or other suitable source of information, and constant speed rotation of the sphere 30 is commenced, the time required for each complete rotation of the sphere 30 is regarded as the equivalent of the time required for a complete rotation of the earth. It will thus be possible, by observing the relative positions of the celestial sphere and the earth or terrestrial sphere, to determine the relative positions on any desired dates subsequent to the original setting of various of the celestial bodies, such as 31, with respect to the earth's surface.

Simulated satellite and drive means

For the purpose of simulating the movement of an earth satellite in any of its various orbits about the earth, and for determining its position relative to the earth and the various celestial bodies at any given time, there is provided a novel mechanism. Said mechanism includes a supporting arm designated 43 in its entirety, which is mounted at one end for rotation about the common axis of the terrestrial and celestial spheres 21 and 30, respectively. In the present embodiment, such a mounting is exemplified by a rubber or other frictional material grommet 44 disposed through a hole in the radially inner end of arm 43 and frictionally receiving and gripping the exteriorly projecting end of a tubular shaft 45, which extends and is rotatably journaled through the fixed shaft 20. An annular bushing 46 fixed on the upper end of the shaft 45 secures the arm and its grommet 44 against accidental displacement. The grommet 44 constitutes a frictional rotational connection between the arm 43 and its shaft 45, which will yield under manual pressure to facilitate initial setting of the mechanism.

Preferably the arm 43 comprises a pair of sections 43a and 43b, respectively interconnected in any suitable manner, as by means of the pivot 47, to permit extensibility of the arm in an arcuate direction from its rotational axis part way around the terrestrial sphere 21. It will be noted, of course, that the two sections, 43a and 43b of the arm, are both arcuately curved, generally concentrically with the curvature of the exterior surface of the terrestrial sphere 21.

Suitably carried at the free end of the arm 43 for rotation about shaft 45 at any of various latitudes, depending upon the adjustment of the arm sections 43a and 43b, is a rotatably supported hub 48, having affixed thereto for rotation therewith a generally radially projecting sweep arm 49 at the free end of which is carried a simulated earth satellite 50, which may comprise simply a bead or other symbolic representation.

In accordance with the invention, the axis about which the sweep arm 49 rotates at the free end of arm section 43b, is made universally angularly adjustable so that the simulated satellite 50 may be made to pursue any of various orbits and these orbits will, of course, be in constantly changing paths about the terrestrial sphere, though remaining fixed with respect to the cellestial sphere as is the case with true satellites. A suitable mode of thus mounting the hub 48 to provide for universal angular adjustment of its rotational axis is illustrated in the accompanying drawings, in which the hub 48 is journaled through a supporting plate 51 for rotation about a fixed axis and the plate 51 is supported in spaced relation above the arm section 43b on a stem 52, having its lower end in the form of a ball 53 received in the socket 54 of a conventional ball and socket joint at the free end of the arm 43b. With this arrangement, tilting of the stem 52 in the socket 54 will correspondingly tilt the rotational axis of the journal 48.

In order to impart rotation to the hub 48 and sweep arm 49, there is disposed through the tubular shaft 45 a conventional flexible shaft 55. The arm 43 is driven through its tubular shaft 55 at a constant rotational speed equivalent to the rotational speed of the celestial sphere 30, so that the orbital path of the simulated satellite 50 will remain in a fixed plane with respect to the celestial sphere. To this end, the arm 43 may, if desired, be suitably connected to the celestial sphere. In the present instance, a connection for this purpose is accomplished through a common drive having branches extending to both the celestial sphere and the arm 43. As has been earlier mentioned, the said drive for the celestial sphere includes the reduction gearing 34 to 36, inclusive, transmitting rotary motion from the drive pin 37 to the driven pinion 33 fixed on the lower end of tubular shaft 32. In order to transmit the drive at the same ratio to the tubular shaft 45 of arm 43, the shaft 45 has its lower end projecting below the frame bracket 16 and keyed thereon is a spur gear 56 of similar diameter to the gear 33. This driven gear 56 meshes with a gear 57, which is keyed on a common shaft 58 with gear 54 of the reduction gearing above mentioned, and is of similar diameter to said reduction gear. It will thus be apparent that through the reduction gearing and the driving motor, the arm 43 and the celestial sphere 30 are interconnected for rotary movement together about the celestial axis.

While the orbit pursued by the satellite 50 will thus remain fixed with respect to the celestial sphere 30, its universally adjustable axis of rotation of the sweep arm 49 about the hub 48 will permit of arranging the orbit of the simulated satellite 50 in such manner that it may be eccentric to the center of the earth, and though still circular, may nevertheless approximate the elliptical orbit and the apogee and perigee thereof at varying distances from the earth, as in an actual earth satellite. It is further desirable that the rotary movement transmitted to the sweep arm 49, through its flexible drive cable 55 may be varied throughout each orbit as in the case of an actual earth satellite, the speed of which is known to be in inverse ratio to the square of its distance from the center of the earth.

The invention, accordingly, contemplates the achieving of such a variable speed of travel throuhgout each orbit, as well as variation in the rate of the number of orbits made within a given period, to thus render the invention capable of simulating the orbits of actual earth satellites. Thus, in the present invention, the flexible drive cable 55 for transmitting rotation to the sweep arm 49 and its satellite 50 extends from its connection to the hub 48 through the tubular shaft 45 and out of the lower end thereof, hence has a driven connection at 59 to the lower end of a countershaft 60. Countershaft 60 is freely rotatably supported through a block 61, which is pivotally connected at 62 to the frame bracket 17 for swinging movement about a horizontal axis. By means of a spring 63 connected under tension between the free end of block 61 and the upper frame bracket 16, the countershaft 60 is resiliently urged toward the driving shaft 18. Because of this, an element 64 fixed on countershaft 60 and constituting the driven element of an infinitely variable ratio friction drive mechanism is urged into frictional driven engagement with a drive cone 65, secured by a set screw 66 on the shaft 18 for rotation therewith. Obviously by loosening the set screw 66 and adjusting the cone 65 up or down the shaft 18 in an axial direction, the driving ratio between the cone 65 and the driven element 64 may be infinitely varied as desired.

The foregoing axial adjustment of the cone 65 will thus permit regulation of the number of orbits achieved by the simulated satellite within a given period as desired. However, in order to vary the angular velocity of the simulated satellite 50 throughout each orbit, further expedients are required, of which two are incorporated in the structure herein shown. One mode of such speed variation within the orbit consists in forming the frictional element 64 as a cylinder 66 supported on the countershaft 60 for rotation therewith and in disposing around the outer periphery of the said cylinder 66 a frictional elastic drive band 66a, which may be arranged on the cylinder 66 in any of various planes at varying angles to the axis of the countershaft 60. With this arrangement, it will be apparent that the band 66a, during each rotation of the cylinder 66 and shaft 60, will engage the frictional drive cone 65 at varying axial locations and therefore at varying diameters to drive the shaft 60, flexible shaft 55 and sweep arm 49 at correspondingly varying speeds throughout each rotation or orbit of the simulated satellite 50.

A further variation of the speed of the simulated satellite 50 throughout each of its orbits may be attained by eccentrically supporting the driven cylinder 66 on its shaft 60, whereby the effective diameter of the cylinder will be varied constantly throughout its rotation at its point of frictional engagement with the cone 65. Where this eccentric arrangement is employed, the frictional band 66a may either be removed or, if desired, may be positioned to lie in a radial plane with respect to the cylinder 65, whereby it will have no speed-varying effect. In order to permit variation of the degree of eccentricity of the cylinder 66, with respect to the countershaft 60, the cylinder 66 may be eccentrically supported on a further eccentric 67 as shown in Figures 1 and 2. Thus, by rotatably adjusting the cylinder 66 about its supporting eccentric 67, the eccentricity of the cylinder 66 with respect to countershaft 60 may be varied as desired. Obviously the speed variations of the simulated satellite 50 throughout each orbit will vary in accordance with such eccentricity, it being apparent that the driven element 65 and the flexible shaft 55, together with the sweep arm 49, are driven at a one-to-one ratio or, in other words, rotate together.

While the various celestial bodies 31, shown in their properly oriented locations on the celestial sphere 30, will normally comprise fixed stars, which are so far from the earth that their real motions are not detected from the earth, this is of course not true as to the sun, and it is impracticable to depict the sun in a fixed position on the celestial sphere. At the same time, it is highly desirable to be able to ascertain the relative position of the sun at a given time with respect to the earth, the celestial sphere, and the simulated satellite 50. For this purpose, the celestial sphere is provided with an annular band of calibrations extending around the ecliptic of the celestial sphere, these calibrations being designated 68 in their entirety. Such calibrations are arranged to indicate the apparent position of the sun for each day of the year.

By thus determining the apparent position of the sun on a given date on the calibrations 68, and by projecting this position along the proper meridian of longitude to the time band, there is obtained a proper indication as to where the noon or meridian hour on the time band 350 should be adjusted in order that the times indicated thereon may be properly correlated with the terrestrial and celestial spheres.

As an aid toward ascertaining the time at which the satellite 50 will pass over a given point on the earth's surface, and in particular to ascertain whether this will occur during the hours of daylight or darkness, there is provided an arcuate yoke 70, which is mounted within the celestial sphere for rotation therein about a fixed axis 71 positioned at the ecliptic pole of the sphere 30. By means of an exterior knob 72, the yoke 70 may be angularly adjusted to any desired position about its axis 71. Carried by the yoke 70 within the sphere 30 and in the plane of the ecliptic of the celestial sphere is a transparent annulus 73, on the outer face of which is printed a suitable designation or symbol 75, representing the sun. This symbol 75, being positioned midway between, or in other words, 90° from either side of the arcuate yoke 70, it will be seen that the center line or plane of said arcuate yoke 70 will indicate the twilight zone as between the light and dark sides of the earth. In use the yoke 70 will be manually positioned by means of its actuating knob 72 to bring the symbol 75 into registry beneath the proper calibration of the calibrations 68 on the surface of the sphere for the preselected day of the year.

In some instances, it will be desirable, also, to provide an artificial horizon of annular conformation designated 76, same being pivotally supported at 77 from opposite legs of a U-shaped yoke 78, the bottom of which is fixed to the frame bracket 16. This artificial horizon 76 may be suitably counterweighted with pendulums (not shown) for maintaining it in a horizontal plane.

In the use of the mechanism herein described, the frictional drive means 64 and 65 is manually adjusted, as is the effective length of the arm 43 and the angular position of the axis about which the sweep arm 49 rotates, all to the end that the simulated satellite 50 may be made to assume an orbit corresponding to and coordinated with that of an actual satellite. By reference to the tabulations of a nautical almanac, the relative rotational positions of the terrestrial and celestial spheres may be manually adjusted and properly interrelated. These adjustments, as well as adjustment of the rotational position of the arm 43, may be manually effected by virtue of the yieldable connections of these parts to their rotary drives as above described. Once these several parts are properly relatively positioned, and the driving motor 15 placed in operation to impart relative movements thereto, it will be apparent that each complete revolution of the celestial sphere 30 and the corresponding changes in position of the several parts will correspond to the changes which occur during a complete revolution of the earth. By causing the celestial sphere 30 to rotate at a plurality of revolutions per day, it will be possible to observe and chart the relative movements of the various parts in advance of their actual occurrence in their real-life counterparts.

Moreover, by use of the sun position calibrations 68 in conjunction with the sun symbol 75, and its yoke 70, it will be possible to predict in advance the date and the approximate time at which time the satellite simulation 50 will pass over any given geographic location on the earth, and to ascertain its geographic location with respect to the earth at any time. With the mechanism herein described, it also is made possible to readily ascertain the relative positions of the earth and various of the celestial bodies, as well as the sun, at any given time. Moreover, by reference to a nautical almanac, it will be readily possible to indicate, as by crayon, and thus geographically indicate, on the sun band or annulus 73 the various positions and phases of the moon at various times, whereby these may be correlated with the position of the simulated satellite 50 at various times.

Obviously less than all of the various components above described may be employed in combination, without completely destroying the utility of the invention, and a mechanism omitting one or more of the aforesaid components falls within the scope of the invention as defined by the appended claims. Similarly, though I have herein shown and described only the preferred embodiment of my invention, I recognize that the invention is capable of other and different embodiments and that its several details may be modified in various ways, all without departing from the invention as defined in the appended claims. Accordingly, the drawings and description herein are to be construed as merely illustrative in nature and by no means as restrictive.

Having thus described my invention, I claim:

1. Mechanism for simulating the relative movements of an earth satellite with respect to the earth and various celestial bodies, comprising an earth sphere having thereon a map of the earth's surface, means fixedly supporting said earth sphere, a transparent celestial sphere disposed concentrically about said earth sphere for rotation about an axis coincident with the north and south poles of the earth sphere, means rotating said celestial sphere at a constant angular speed about said axis, a radial arm disposed between said earth sphere and said celestial sphere for rotation about said axis, a sweep arm mounted at the free end of said radial arm for rotation about an axis angularly displaced with respect to the axis of said earth sphere, a simulated satellite at the free end of said arm, means for rotating said radial arm about the rotational axis of said celestial sphere, and means simultaneously rotating said sweep arm at a different rotational speed about its said axis, in combination with an annular band of indicia encircling the celestial sphere concentrically to the ecliptic, and calibrated to indicate the positions of the sun in the celestial sphere at various times of the calendar year, and an annular time band rotatably supported for adjustment around said celestial sphere to have its midday calibration positioned along the meridian on which the sun is positioned on a given date.

2. Mechanism as defined in claim 1, wherein said means fixedly supporting the earth sphere comprises a supporting frame and a tubular shaft fixed to said frame, said shaft extending through the earth sphere from pole to pole thereof, and having a free end between the earth sphere and the celestial sphere, said shaft defining the rotational axis of said celestial sphere.

3. Mechanism for simulating the relative movements of an earth satellite with respect to the earth and the various fixed celestial bodies, comprising an earth sphere having thereon a map of the earth's surface, means fixedly supporting said earth sphere, a transparent celestial sphere disposed concentrically about said earth sphere for rotation about an axis coincident with the north and south poles of the earth sphere, means rotating said celestial sphere at a constant angular speed about said axis, a radial arm disposed between said earth sphere and said celestial sphere for rotation about said axis, said arm being curved about the surface of the earth sphere, a sweep arm mounted at the free end of said radial arm for rotation about an axis angularly displaced from the axis of said earth sphere, a simulated satellite at the free end of said arm, means for rotating said radial arm about the rotational axis of said celestial sphere, and means simultaneously rotating said sweep arm at a different rotational speed about its said axis, said means for rotating the sweep arm including a constant speed motor, a variable speed transmission driven by said motor, a flexible shaft transmitting rotation from the transmission to said sweep arm, and means in said transmission for varying the angular speed of said flexible shaft throughout each revolution thereof, in combination with an annular band of indicia encircling the celestial sphere concentrically to the ecliptic, and calibrated to indicate the positions of the sun in the celestial sphere at various times of the calendar year, and an annular time band rotatably supported around said celestial sphere for proper orientation with respect to the position of the sun at a given date.

4. Means for simulating the relative movements of an earth satellite with respect to the earth and various celestial bodies, comprising an earth sphere having thereon a map of the earth's surface, means fixedly supporting said earth sphere, a transparent celestial sphere disposed concentrically about said earth sphere for rotation about an axis coincident with the north and south poles of the earth sphere, means rotating said celestial sphere at a constant angular speed about said axis, a radial arm disposed between said earth sphere and said celestial sphere for rotation about said axis, a sweep arm mounted at the free end of said radial arm for rotation about an axis angularly displaced with respect to the axis of said earth sphere, a simulated satellite at the free end of said arm, means for rotating said radial arm at a constant speed about the rotational axis of said celestial sphere, and means simultaneously rotating said sweep arm at a different rotational speed about its said axis.

5. Mechanism for simulating the relative movements of an earth satellite with respect to the earth and the various fixed celestial bodies, comprising an earth sphere having thereon a map of the earth's surface, means comprising a frame and a fixed tubular shaft coincident with the earth's axis fixedly supporting said earth sphere, a transparent celestial sphere disposed concentrically about said earth sphere for rotation about an axis defined by said shaft, means rotating said celestial sphere at a constant angular speed about said axis, a tubular drive shaft rotatably journaled through said fixed shaft, a radial arm fixedly supported on said drive shaft between said earth sphere and said celestial sphere and curved about said earth sphere for rotation about said axis, a sweep arm mounted at the free end of said radial arm for rotation about an axis angularly displaced with respect to the axis of said earth sphere, a simulated satellite at the free end of said arm, means for rotating said drive shaft at a constant rotational speed, and means extending through said drive shaft simultaneously rotating said sweep arm at a different rotational speed about its said axis.

6. Mechanism as defined in claim 5, wherein said means extending through the drive shaft comprises a flexible shaft, a motor disposed on said frame outside of both spheres being operatively connected to both said drive shaft and said flexible shaft.

7. Mechanism as defined in claim 5 wherein said radial arm comprises a plurality of sections relatively adjustably interconnected to render said arm in its entirety arcuately extensible and retractible around the earth sphere.

8. Mechanism for simulating the relative movements of an earth satellite with respect to the earth, comprising an earth sphere having thereon a map of the earth's surface, means fixedly supporting said earth sphere, a tubular drive shaft rotatably disposed through said sphere and through the opposite poles of the earth as depicted by said map, a radial arm fixed on said drive shaft for rotation about the axis of said earth sphere and curved about the surface of the earth sphere, said arm comprising a plurality of sections movably interconnected for varying the distance of its free end from its axis, a sweep arm mounted at the free end of said radial arm for rotation about an axis angularly displaced with respect to the axis of said earth sphere, a simulated satellite at the free end of said arm, means connected to said drive shaft for rotating said radial arm about its rotational axis, and means including a flexible shaft extending through said drive shaft for simultaneously rotating said sweep arm about its said axis.

9. Mechanism for simulating the relative movements of an earth satellite with respect to the earth and various celestial bodies, comprising an earth sphere having thereon a map of the earth's surface, means including a hollow shaft coincident with the earth's axis fixedly supporting said earth sphere, a transparent celestial sphere disposed concentrically about said earth sphere for rotation about said shaft, means rotating said celestial sphere at a constant angular speed about said axis, means rotatable with said celestial sphere defining a rotational axis at an angle to said hollow shaft, a sweep arm mounted between said spheres for rotation about said last-mentioned axis and a flexible shaft rotatably disposed through said hollow shaft and operatively connected to the sweep arm for transmitting rotation thereto.

10. Mechanism for simulating the relative movements of an earth satellite with respect to the earth and the various fixed celestial bodies, comprising an earth sphere having thereon a map of the earth's surface, means fixedly supporting said earth sphere, a transparent celestial sphere disposed concentrically about said earth sphere for rotation about an axis coincident with the north and south poles of the earth sphere, means rotating said celestial sphere at a constant angular speed about said axis, means connected to said celestial sphere for rotation therewith and defining a rotational axis at an angle to said hollow shaft, a sweep arm mounted between said spheres for rotation about said last-mentioned axis and a flexible shaft rotatably disposed through said hollow shaft and operatively connected to the sweep arm for transmitting rotation thereto, and drive means externally of said spheres connected to and rotating said flexible shaft independently of the rotation of said celestial sphere.

11. Mechanism for simulating the relative movements of an earth satellite with respect to the sun and various fixed celestial bodies, comprising a transparent celestial sphere disposed for rotation about a fixed axis, means rotating said celestial sphere at a constant angular speed about said axis, a radial arm disposed within said celestial sphere for rotation about said axis, a sweep arm mounted at the free end of said radial arm for rotation about an axis angularly displaced with respect to the axis of said celestial sphere, a simulated satellite at the free end of said arm, means for rotating said radial arm about the rotational axis of said celestial sphere, and means simultaneously rotating said sweep arm about its said axis, in combination with an annular band of indicia encircling the celestial sphere concentrically to the ecliptic, and calibrated to indicate the positions of the sun in the celestial sphere at various times of the calendar year, and an annular time band rotatably supported for manual orientation with respect to the positions of the sun on any given date.

12. Means for simulating the relative movements of an earth satellite with respect to the earth and the various fixed celestial bodies, comprising a transparent celestial sphere disposed for rotation about a fixed axis, means rotating said celestial sphere at a constant angular speed about said axis, a radial arm disposed within said celestial sphere for rotation about said axis, a sweep arm mounted at the free end of said radial arm for rotation about an axis angularly displaced from the axis of said celestial sphere, a simulated satellite at the free end of said arm means for rotating said radial arm about the rotational axis of said celestial sphere, and means simultaneously rotating said sweep arm about its said axis.

13. Mechanism for simulating the relative movements of an earth satellite, the earth and various celestial bodies, comprising a supporting frame, a tubular supporting shaft having one end fixed to said frame and a free end portion projecting therefrom, a terrestrial sphere having thereon a cap of the earth's surface, said free end portion extending diametrically through said terrestrial sphere coincidentally with the rotational axis of the earth and fixedly supporting said sphere, a transparent celestial sphere concentrically enclosing said terrestrial sphere and rotatable about said supporting shaft, means for rotating said celestial sphere about said axis at a predetermined constant rate comprising a constant speed motor mounted on said frame externally of both spheres, and speed reduction gearing operatively connecting said motor to said celestial sphere, a tubular drive shaft rotatably supported through said supporting shaft and projecting from the free end thereof, and means including said motor for rotating said drive shaft from a location outside of said spheres, a generally radial supporting arm carried by said drive shaft for rotation therewith between said inner and outer spheres, a sweep arm supported at the free end of said radial arm for rotation about an axis eccentric to the center of said spheres, a simulated earth satellite carried at the free end of said sweep arm for movement in a predetermined orbit eccentric to the said spheres, mechanism connected to said sweep arm comprising a flexible drive shaft disposed through said tubular drive shaft for rotation independently thereof, said flexible shaft being operatively connected in driving relation to said sweep arm, an infinitely variable speed friction transmission interconnecting said constant speed motor in driving relation to said flexible shaft externally of the spheres, said tubular drive shaft and radial supporting arm being driven at the same angular speed as said celestial sphere, whereby the orbit of said simulated satellite will remain constant with respect to said celestial sphere, but will vary constantly with respect to the terrestrial sphere.

14. Mechanism for simulating the relative movements of an earth satellite, the earth and various celestial bodies, comprising a supporting frame, a tubular supporting shaft having one end fixed to said frame and a free end portion projecting therefrom, a terrestrial sphere having thereon a map of the earth's surface, said free end portion extending diametrically through said terrestrial sphere coincidentally with the rotational axis of the earth and fixedly supporting said sphere, a transparent celestial sphere concentrically enclosing said terrestrial sphere and rotatable about said supporting shaft, said celestial sphere having various major stars depicted on its surface in their proper positions relative to each other and to the rotational axis defined by said supporting shaft, an arcuate supporting yoke disposed concentrically to both spheres for rotary adjustment about an axis extending through the ecliptic poles of the celestial sphere, a transparent circular band carried by the said yoke concentrically within said spheres and in the plane of the ecliptic, a symbol on said band representing the apparent position of the sun, indicia on the outer face of said celestial sphere over said band showing the positions of the sun in said celestial sphere at various times during the calendar year, means for manually rotating said band to bring said sun symbol to its proper position for a given time of year, an annular time band extending externally around and concentrically to said celestial sphere in the equatorial plane of the terrestrial sphere, and supported on the celestial sphere for angular adjustment therearound, and time indicia indicative of the twenty-four hours of the day extending around said time band.

References Cited in the file of this patent

UNITED STATES PATENTS

| | | |
|---|---|---|
| 336,280 | Bailey | Feb. 16, 1886 |
| 469,719 | Reavis | Mar. 1, 1892 |
| 1,290,664 | Russell et al. | Jan. 7, 1919 |
| 1,952,024 | Russert | Mar. 20, 1934 |
| 2,515,401 | Dupler | July 18, 1950 |
| 2,754,597 | Sylvester | July 17, 1956 |
| 2,825,151 | Farquhar | Mar. 4, 1958 |